US006211321B1

United States Patent
Takagishi et al.

(10) Patent No.: US 6,211,321 B1
(45) Date of Patent: Apr. 3, 2001

(54) DIENE RUBBER

(75) Inventors: Yukio Takagishi; Masao Nakamura, both of Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/077,358

(22) PCT Filed: Nov. 28, 1996

(86) PCT No.: PCT/JP96/03479

§ 371 Date: May 28, 1998

§ 102(e) Date: May 28, 1998

(87) PCT Pub. No.: WO97/19966

PCT Pub. Date: Jun. 5, 1997

(30) Foreign Application Priority Data

Nov. 28, 1995 (JP) .................................................... 7-332837
Feb. 23, 1996 (JP) .................................................... 8-061775

(51) Int. Cl.[7] .................................................... C08F 36/04
(52) U.S. Cl. ............................................ 526/335; 526/310
(58) Field of Search ..................................... 526/335, 310

(56) References Cited

U.S. PATENT DOCUMENTS

| 3,544,532 | 12/1970 | Jones et al. | 260/79.7 |
|---|---|---|---|
| 3,904,580 | 9/1975 | Lasis et al. | 260/42.47 |
| 4,112,207 | 9/1978 | Jones | 526/17 |
| 4,423,198 | * 12/1983 | Tsai | 526/263 |
| 4,454,304 | * 6/1984 | Tsai | 525/210 |
| 5,880,206 | * 3/1999 | Nakamura et al. | 524/572 |

FOREIGN PATENT DOCUMENTS

| 2613050 | 9/1977 | (DE) . |
|---|---|---|
| 50-75636 | 6/1975 | (JP) . |
| 58-154742 | * 9/1983 | (JP) . |
| 58-41282 | 9/1983 | (JP) . |
| 64-22940 | 1/1989 | (JP) . |
| 01101344 | 4/1989 | (JP) . |
| 01146907 | 6/1989 | (JP) . |
| 01188501 | 7/1989 | (JP) . |
| 4-68342 | 3/1992 | (JP) . |
| 05230286 | 9/1993 | (JP) . |
| 06073305 | * 3/1994 | (JP) . |

OTHER PUBLICATIONS

Japan Patent No. JP 01146907, abstract (Itoda et al.); "Polymer emulsion and its preparation", Jun. 8, 1989.*

* cited by examiner

Primary Examiner—Cynthia Hamilton
Assistant Examiner—Yvette M. Clarke
(74) Attorney, Agent, or Firm—Sherman & Shalloway

(57) ABSTRACT

This invention provides a diene rubber capable of yielding a vulcanized rubber having improved heat build-up, tensile strength and abrasion resistance, processes for preparing the same, and rubber compositions containing the same. The diene rubber is composed of 40 to 99.99% by weight of conjugated diene monomer units, 0 to 50% by weight of aromatic vinyl monomer units, and 0.01 to 20% by weight of vinyl monomer units containing a tertiary amino group which is at least partially quaternized with a hydrocarbon radical, and has a Mooney viscosity ($ML_{1+4}$, 100° C.) of 10 to 200.

24 Claims, No Drawings

DIENE RUBBER

TECHNICAL FIELD

This invention relates to a diene rubber which, when silica is incorporated thereinto as a reinforcing agent, can yield a vulcanized rubber having improved heat build-up, tensile strength and abrasion resistance, and processes for preparing the same. This invention also relates to rubber compositions containing a rubber component comprising the diene rubber and a reinforcing agent.

BACKGROUND ART

In recent years, as growing importance is attached to resource saving and environmental protection, the demand for a reduction in the fuel consumption of automobiles has become increasingly stronger. Also for automobile tires, it is desired to reduce their rolling resistance and thereby contribute to a reduction in fuel consumption. In order to reduce the rolling resistance of tires, it is common practice to use a rubber material which can yield a vulcanized rubber showing a low degree of heat build-up.

Conventionally, it has been proposed to reduce heat build-up by using, as the rubber material for tires, a rubber composition comprising a diene rubber into which, in place of carbon black, silica is incorporated as a reinforcing agent. However, as compared with carbon black-filled rubber compositions, such silica-filled rubber compositions have the disadvantage that they fail to achieve sufficient abrasion resistance and tensile strength. One of the causes therefor is believed to be that silica has a lower affinity for diene rubbers than carbon black and hence fails to exhibit a sufficient reinforcing effect.

Conventionally, in order to enhance the affinity of silica for diene rubbers, the use of a diene rubber into which a substituent group having an affinity for silica has been introduced is being investigated. For example, diene rubbers having a tertiary amino group introduced thereinto (Japanese Patent Laid-Open No. 101344/'89) have been proposed for diene rubbers formed by emulsion polymerization; and diene rubbers having introduced thereinto an alkylsilyl group (Japanese Patent Laid-Open No. 188501/'89), a halogenated silyl group (Japanese Patent Laid-Open No. 230286/'93) or a substituted amino group (Japanese Patent Laid-Open No. 22940/'89) have been proposed for diene rubbers formed by anionic polymerization. However, these diene rubbers having a substituent group introduced thereinto fail to show sufficient improvements in heat build-up, tensile strength and abrasion resistance.

On the other hand, in order to improve green strength, Japanese Patent Publication No. 41282/'83 discloses a rubber composition comprising the reaction product of a tertiary amino-containing butadiene-styrene copolymer with a dihalide [e.g., 4,4'-bis(bromoacetyl)diphenylmethane (hereinafter abbreviated as BADE)], and carbon black. However, if this reaction product is blended with silica, the resulting composition shows an improvement in tensile strength, but fails to show an improvement in heat build-up which must be characteristic of a silica-filled material. Moreover, this composition also has the disadvantage that its properties such as abrasion resistance are not satisfactory.

An object of the present invention is to provide a diene rubber which, when silica is incorporated thereinto as a reinforcing agent, can yield a vulcanized rubber that shows an improvement in heat build-up serving as an indication of rolling resistance and that has substantially the same tensile strength and abrasion resistance as when carbon black is incorporated thereinto, as well as processes for preparing the same.

Another object of the present invention is to provide a rubber containing a diene rubber and a reinforcing agent, and capable of yielding a vulcanized rubber which is excellent in heat build-up, tensile strength and abrasion resistance.

DISCLOSURE OF THE INVENTION

The present inventors have made intensive investigations with a view to overcoming the above-described problems of the prior art. As a result, it has now been discovered that a rubber composition capable of yielding a vulcanized rubber having sufficiently excellent build-up, tensile strength and abrasion resistance can be obtained by using, as a rubber component, a diene rubber containing a tertiary amino group which is at least partially quaternized with a hydrocarbon radical (that may hereinafter be referred to briefly as the quaternary ammonium-containing diene rubber) and that the quaternary ammonium-containing diene rubber can be efficiently prepared by reacting a diene rubber having therein a copolymerized tertiary amino-containing vinyl monomer with a monohalogenated hydrocarbon or by reacting a diene rubber having therein a copolymerized halogen-containing vinyl monomer with a tertiary amine. The present invention has been completed on the basis of this discovery.

Thus, the present invention provides a diene rubber composed of 40 to 99.99% by weight of combined units of a conjugated diene monomer, 0 to 50% by weight of combined units of an aromatic vinyl monomer, and 0.01 to 20% by weight of combined units of a vinyl monomer containing a tertiary amino group which is at least partially quaternized with a hydrocarbon group, and having a Mooney viscosity ($ML_{1+4}$, 100° C.) of 10 to 200, wherein the tertiary amino-containing vinyl monomer is a compound of the formula

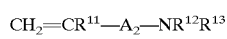

$$CH_2=CR^{11}-A_2-NR^{12}R^{13}$$

where $R^{11}$ is a hydrogen atom or a lower alkyl group, $R^{12}$ and $R^{13}$ are each an alkyl group, an aryl group or an aralkyl group, $A_2$ is an alkylene group, an arylene group, an arylene-alkylene group, an alkylene-arylene group, or a linking group of the general formula $-C(=O)-M-R^{14}-$ (in which M is an oxy group or an NH group, and $R^{14}$ is an alkylene group, an arylene group, an arylene-alkylene group or an alkylene-arylene group), and $R^{12}$ or $R^{13}$ may be combined with $A_2$ to form a heterocyclic ring, the quaternized tertiary amino-containing vinyl monomer is a compound of the formula

$$CH_2=CR^1-A_1-N^+R^2R^3R^4.X_1^-$$

where $R^1$ is a hydrogen atom or a lower alkyl group, $R^2$, $R^3$ and $R^4$ are each an alkyl group, an aryl group or an aralkyl group, $A_1$ is an alkylene group, an arylene group, an arylene-alkylene group, an alkylene-arylene group, or a linking group of the general formula $-C(=O)-M-R^5-$ (in which M is an oxy group or an NH group, and $R^5$ is an alkylene group, an arylene group, an arylene-alkylene group or an alkylene-arylene group), $R^2$ or $R^3$ may be combined with $A_1$ to form a heterocyclic ring, and $X_1$ is a halogen atom.

Moreover, the present invention also provides a process for preparing the aforesaid diene rubber which comprises copolymerizing a conjugated diene, or a conjugated diene and an aromatic vinyl, with a tertiary amino-containing vinyl monomer and subsequently reacting the resulting polymer with a monohalogenated hydrocarbon.

Furthermore, the present invention also provides a process for preparing the aforesaid diene rubber which comprises copolymerizing a conjugated diene, or a conjugated diene and an aromatic vinyl, with a halogen-containing vinyl monomer and subsequently reacting the resulting polymer with a tertiary amine.

In addition, the present invention also provides a rubber composition containing a rubber component comprising the aforesaid diene rubber, and a reinforcing agent.

Quaternary Ammonium-containing Diene Rubber

The diene rubber of the present invention is composed of combined units of a conjugated diene monomer and combined units of a tertiary amino-containing vinyl monomer which is at least partially quaternized with a hydrocarbon group (i.e., combined units of a quaternary ammonium-containing vinyl monomer and combined units of a tertiary amino-containing vinyl monomer; hereinafter referred to as "combined units of an at least partially quaternized tertiary amino-containing vinyl monomer"), and contains combined units of an aromatic vinyl monomer as required. Examples of the conjugated diene include 1,3-butadiene, 2-methyl-1,3-butadiene, 2,3-dimethyl-1,3-butadiene, 2-chloro-1,3-butadiene and 1,3-pentadiene. Among them, 1,3-butadiene and 2-methyl-1,3-butadiene are preferred and 1,3-butadiene is more preferred. These conjugated dienes may be used alone or in admixture of two or more.

No particular limitation is placed on the type of the quaternizing hydrocarbon group. However, the quaternizing hydrocarbon group is, for example, an alkyl group, an aryl group or an aralkyl group, and preferably an alkyl group. Examples of the alkyl group include methyl, ethyl, propyl, isopropyl, n-butyl, sec-butyl, tert-butyl, n-pentyl, isopentyl, n-hexyl, n-octyl and n-decyl groups. Among them, lower alkyl groups such as methyl, ethyl, propyl, isopropyl, n-butyl, sec-butyl, tert-butyl, n-pentyl, isopentyl and n-hexyl groups are preferred; methyl, ethyl, propyl and butyl groups are more preferred; and methyl and ethyl groups are most preferred. Examples of the aryl group include phenyl and lower alkyl-substituted phenyl groups. Examples of the aralkyl group include benzyl, phenetyl, and lower alkyl-substituted benzyl groups. No particular limitation is placed on the number of carbon atoms of the hydrocarbon group. However, it is usually in the range of 1 to 20, preferably 1 to 10, and more preferably 1 to 6.

Examples of the quaternary ammonium-containing vinyl monomer quaternized with a hydrocarbon group include compounds of the general formula (1)

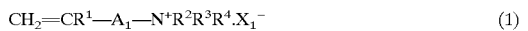

$$CH_2=CR^1-A_1-N^+R^2R^3R^4 \cdot X_1^-  \quad (1)$$

where $R^1$ is a hydrogen atom or a lower alkyl group, $R^2$, $R^3$ and $R^4$ are each an alkyl group, an aryl group or an aralkyl group, $A_1$ is an alkylene group, an arylene group, an arylene-alkylene group, an alkylene-arylene group, or a linking group of the general formula $-C(=O)-M-R^5-$ (in which M is an oxy group or an NH group, and $R^5$ is an alkylene group, an arylene group, an arylene-alkylene group or an alkylene-arylene group), $R^2$ or $R^3$ may be combined with $A_1$ to form a heterocyclic ring, and $X_1$ is a halogen atom.

Where $R^1$ in the general formula (1) is a lower alkyl group, specific examples thereof include methyl, ethyl, n-propyl, isopropyl, n-butyl, sec-butyl and n-hexyl groups. Among them, a methyl group is preferred.

$R^2$ and $R^3$ and $R^4$ in the general formula (1) are each independently an alkyl group, an aryl group or an aralkyl group, and preferably an alkyl group. Examples of the alkyl group include methyl, ethyl, propyl, isopropyl, n-butyl, sec-butyl, tert-butyl, n-pentyl, isopentyl, n-hexyl, n-octyl and n-decyl groups. Among them, lower alkyl groups such as methyl, ethyl, propyl, isopropyl, n-butyl, sec-butyl, tert-butyl, n-pentyl, isopentyl and n-hexyl groups are preferred; methyl, ethyl, propyl and butyl groups are more preferred; and methyl and ethyl groups are most preferred. Examples of the aryl group include phenyl and lower alkyl-substituted phenyl groups. Examples of the aralkyl group include benzyl, phenetyl, and lower alkyl-substituted benzyl groups.

$A_1$ in the general formula (1) is an alkylene group, an arylene group, an arylene-alkylene group, an alkylene-arylene group, or a linking group of the general formula $-C(=O)-M-R^5-$ (in which M is an oxy group or an NH group, and $R^5$ is an alkylene group, an arylene group, an arylene-alkylene group or an alkylene-arylene group). Preferably, $A_1$ is an arylene-alkylene group, an alkylene-arylene group, or a linking group of the general formula $-C(=O)-M-R^5-$.

Examples of the alkylene group include methylene, ethylene, n-propylene, isopropylene, n-butylene, isobutylene, sec-butylene, tert-butylene and n-hexylene groups. Examples of the arylene group include 1,2-phenylene, 1,3-phenylene and 1,4-phenylene groups. In these arylene groups, some hydrogen atoms may be replaced with lower alkyl groups. Examples of the arylene-alkylene group and the alkylene-arylene group include various combinations of the foregoing groups.

Examples of the alkyleneoxycarbonyl and aryleneoxycarbonyl groups represented by the general formula $-C(=O)-O-R^5-$ include carbonyloxyalkylene groups such as carbonyloxymethylene, carbonyloxyethylene, carbonyloxy-n-propylene, carbonyloxyisopropylene, carbonyloxy-n-butylene, carbonyloxy-tert-butylene, carbonyloxy-n-hexylene and carbonyloxy-n-octylene groups; and carbonyloxy-1,2-phenylene, carbonyloxy-1,3-phenylene and carbonyloxy-1,4-phenylene groups. Among them, carbonyloxyethylene, carbonyloxy-n-propylene and carbonyloxy-n-butylene groups are preferred.

Examples of the alkyleneamido and aryleneamido groups represented by the general formula $-C(=O)-NH-R^5$ include carbonyliminoalkylene groups such as carbonyliminomethylene, carbonyliminoethylene, carbonylimino-n-propylene, carbonyliminoisopropylene, carbonylimino-n-butylene, carbonylimino-tert-butylene, carbonylimino-n-hexylene and carbonylimino-n-octylene groups; and carbonylimino-1,2-phenylene, carbonylimino-1,3-phenylene and carbonylimino-1,4-phenylene groups.

Moreover, $R^2$ or $R^3$ may be combined with $A_1$ to form a heterocyclic ring. Preferably, $R^2$, $R^3$ and $A_1$ are combined together to form a pyridinium ring.

$R^4$ in the general formula (1) is an alkyl group, an aryl group or an aralkyl group, and preferably an alkyl group. Examples of the alkyl group include methyl, ethyl, propyl, isopropyl, n-butyl, sec-butyl, tert-butyl, n-pentyl, isopentyl, n-hexyl, n-octyl and n-decyl groups. Among them, lower alkyl groups such as methyl, ethyl, propyl, isopropyl, n-butyl, sec-butyl, tert-butyl, n-pentyl, isopentyl and n-hexyl groups are preferred; methyl, ethyl, propyl and butyl groups are more preferred; and methyl and ethyl groups are most preferred. Examples of the aryl group include phenyl and lower alkyl-substituted phenyl groups. Examples of the aralkyl group include benzyl, phenetyl, and lower alkyl-substituted benzyl groups.

$X_1$ in the general formula (1) is a halogen atom. Specific examples thereof include chlorine, bromine, iodine and fluorine atoms. Among them, chlorine, bromine and iodine atoms are preferred.

Among these quaternary ammonium-containing vinyl monomers represented by the general formula (1), preferred examples thereof are compounds of the general formula (2)

$$CH_2=CR^6-Ph(R^7)-(CH_2)_m-N^+R^8R^9R^{10}.X_2^+ \qquad (2)$$

where $R^6$ and $R^7$ are each a hydrogen atom or a lower alkyl group, $R^8$, $R^9$ and $R^{10}$ are each an alkyl group, an aryl group or an aralkyl group, $X_2$ is a halogen atom, and m is an integer of 1 to 6.

$R^6$ and $R^7$ in the general formula (2) are each a hydrogen atom or a lower alkyl group. Examples of the lower alkyl group represented by $R^6$ include methyl, ethyl, n-propyl, isopropyl, n-butyl, sec-butyl and n-hexyl groups. Among them, a methyl group is preferred.

$R^8$ and $R^9$ in the general formula (2) are each independently an alkyl group, an aryl group or an aralkyl group, and preferably an alkyl group. Examples of the alkyl group include methyl, ethyl, propyl, isopropyl, n-butyl, sec-butyl, tert-butyl, n-pentyl, isopentyl, n-hexyl, n-octyl and n-decyl groups. Among them, lower alkyl groups such as methyl, ethyl, propyl, isopropyl, n-butyl, sec-butyl, tert-butyl, n-pentyl, isopentyl and n-hexyl groups are preferred; methyl, ethyl, propyl and butyl groups are more preferred; and methyl and ethyl groups are most preferred. Examples of the aryl group include phenyl and lower alkyl-substituted phenyl groups. Examples of the aralkyl group include benzyl, phenetyl, and lower alkyl-substituted benzyl groups.

$R^{10}$ in the general formula (2) is an alkyl group, an aryl group or an aralkyl group, and preferably an alkyl group. Examples of the alkyl group include methyl, ethyl, propyl, isopropyl, n-butyl, sec-butyl, tert-butyl, n-pentyl, isopentyl, n-hexyl, n-octyl and n-decyl groups. Among them, lower alkyl groups such as methyl, ethyl, propyl, isopropyl, n-butyl, sec-butyl, tert-butyl, n-pentyl, isopentyl and n-hexyl groups are preferred; methyl, ethyl, propyl and butyl groups are more preferred; and methyl and ethyl groups are most preferred. Examples of the aryl group include phenyl and lower alkyl-substituted phenyl groups. Examples of the aralkyl group include benzyl, phenetyl, and lower alkyl-substituted benzyl groups.

$X_2$ in the general formula (2) is a halogen atom. Specific examples thereof include chlorine, bromine, iodine and fluorine atoms. Among them, chlorine, bromine and iodine atoms are preferred.

m in the general formula (2) is an integer of 1 to 6, preferably 1 to 4, and more preferably 1 or 2.

These quaternary ammonium-containing vinyl monomers may be used alone or in admixture of two or more.

No particular limitation is placed on the type of the tertiary amino-containing vinyl monomer, provided that it is a polymerizable monomer having a tertiary amino group. Examples thereof include the tertiary amino-containing vinyl monomers which correspond to the quaternary ammonium-containing vinyl monomer of the above general formula (1) and which are represented by the general formula (3)

$$CH_2=CR^{11}-A_2-NR^{12}R^{13} \qquad (3)$$

where $R^{11}$ is a hydrogen atom or a lower alkyl group, $R^{12}$ and $R^{13}$ are each an alkyl group, an aryl group or an aralkyl group, $A_2$ is an alkylene group, an arylene group, an arylene-alkylene group, an alkylene-arylene group, or a linking group of the general formula $-C(=O)-M-R^{14}-$ (in which M is an oxy group or an NH group, and $R^{14}$ is an alkylene group, an arylene group, an arylene-alkylene group or an alkylene-arylene group), and $R^{12}$ or $R^{13}$ may be combined with $A_2$ to form a heterocyclic ring. Specific examples of $R^{11}$, $R^{12}$, $R^{13}$ and $A_2$ are the same as the specific examples of $R^1$, $R^2$, $R^3$ and $A_1$ which have previously been described in connection with the general formula (1).

Moreover, the tertiary amino-containing vinyl monomers corresponding to the quaternary ammonium-containing vinyl monomer of the above general formula (2) are represented by the general formula (4)

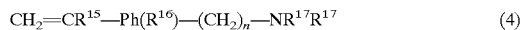
$$CH_2=CR^{15}-Ph(R^{16})-(CH_2)_n-NR^{17}R^{17} \qquad (4)$$

where $R^{15}$ and $R^{16}$ are each a hydrogen atom or a lower alkyl group, $R^{17}$ and $R^{18}$ are each an alkyl group, an aryl group or an aralkyl group, and n is an integer of 1 to 6. Specific examples of $R^{15}$, $R^{16}$, $R^{17}$, $R^{18}$ and n are the same as the specific examples of $R^6$, $R^7$, $R^8$, $R^9$ and m which have previously been described in connection with the general formula (2).

Examples of the tertiary amino-containing vinyl monomers include N,N-disubstituted aminoalkyl (meth)acrylates, N,N-disubstituted aminoalkyl(meth)acrylamides, N,N-disubstituted amino aromatic vinyl compounds, N,N-disubstituted aminoalkyl aromatic vinyl compounds and pyridyl-containing vinyl compounds. Among them, N,N-disubstituted aminoalkyl(meth)acrylamides, N,N-disubstituted aminoalkyl aromatic vinyl compounds and pyridyl-containing vinyl compounds are particularly preferred.

Examples of the N,N-disubstituted amino (meth)acrylates include N,N-dimethylaminomethyl (meth)acrylate, N-methyl-N-ethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-diethylaminoethyl (meth)acrylate, N,N-diethylaminopropyl (meth)acrylate, N,N-diethylaminobutyl (meth)acrylate, N-methyl-N-ethylaminoethyl (meth)acrylate, N,N-dipropylaminoethyl (meth)acrylate, N,N-dibutylaminoethyl (meth)acrylate, N,N-dibutylaminopropyl (meth)acrylate, N,N-dibutylaminobutyl (meth)acrylate, N, N-dihexylaminoethyl (meth)acrylate, N, N-dioctylaminoethyl (meth)acrylate and acryloylmorpholine. Among them, N,N-dimethylaminoethyl (meth)acrylate, N,N-diethylaminoethyl (meth)acrylate, N,N-dipropylaminoethyl (meth)acrylate, N,N-dioctylaminoethyl (meth)acrylate and N-methyl-N-ethylaminoethyl (meth)acrylate are preferred.

Examples of the N,N-disubstituted aminoalkyl(meth) acrylamides include acrylamide or methacrylamide compounds such as N,N-dimethylaminomethyl(meth)acrylamide, N-methyl-N-ethylaminomethyl(meth)acrylamide, N,N-dimethylaminoethyl(meth)acrylamide, N,N-dimethylaminopropyl (meth) acrylamide, N,N-dimethylaminobutyl (meth)acrylamide, N,N-diethylaminoethyl(meth)acrylamide, N,N-diethylaminopropyl(meth)acrylamide, N,N-diethylaminobutyl(meth)acrylamide, N-methyl-N-ethylaminoethyl(meth)acrylamide, N,N-dipropylaminoethyl (meth)acrylamide, N,N-dibutylaminoethyl(meth) acrylamide, N,N-dibutylaminopropyl(meth)acrylamide, N,N-dibutylaminobutyl(meth)acrylamide, N,N-dihexylaminoethyl(meth)acrylamide, N,N-dihexylaminopropyl(meth)acrylamide and N,N-dioctylaminopropyl(meth)acrylamide. Among them, N,N-dimethylaminopropyl(meth)acrylamide, N,N- diethylaminopropyl(meth)acrylamide and N,N-dioctylaminopropyl(meth)acrylamide are preferred.

Examples of the N,N-disubstituted amino aromatic vinyl compounds and N,N-disubstituted aminoalkyl aromatic vinyl compounds include p-N,N-dimethylaminostyrene, p-N-methyl-N-ethylaminostyrene, p-N,N-dimethylaminomethylstyrene, p-N,N-diethylaminomethylstyrene, p-N,N-diisopropylaminomethylstyrene, p-N,N-dimethylaminoethylstyrene, p-N,N-diethylaminoethylstyrene, p-N,N-dipropylaminoethylstyrene, p-N,N-dioctylaminoethylstyrene, p-N,N-dimethylaminopropylstyrene, p-N,N-diethylaminopropylstyrene, p-N,N-dimethylaminobutylstyrene and p-N,N-diethylaminobutylstyrene. Among them, p-N,N-dimethylaminomethylstyrene, p-N,N-dimethylaminomethylstyrene, p-N,N-diisopropylaminomethylstyrene, p-N,N-dimethylaminoethylstyrene, p-N,N-diethylaminoethylstyrene and p-N,N-dipropylaminoethylstyrene are preferred.

Examples of the pyridyl-containing vinyl compounds include 2-vinylpyridine, 4-vinylpyridine, 5-methyl-2-vinylpyridine and 5-ethyl-2-vinylpyridine. Among them, 2-vinylpyridine and 4-vinylpyridine are preferred.

These tertiary amino-containing vinyl monomers may be used alone or in admixture of two or more.

The aromatic vinyl is an aromatic vinyl compound having neither tertiary amino group nor quaternary ammonium group. Examples thereof include styrene, α-methylstyrene, 2-methylstyrene, 3-methylstyrene, 4-methylstyrene, 2,4-diisopropylstyrene, 2,4-dimethylstyrene, 4-t-butylstyrene and 5-t-butyl-2-methylstyrene. Among them, styrene is preferred. These aromatic vinyls may be used alone or in admixture of two or more.

The presence or absence of combined units of the aromatic vinyl in the diene rubber of the present invention may be suitably chosen according to the purpose of use.

Where particular importance is attached to heat build-up, there is used a copolymer composed of combined units of a conjugated diene monomer and combined units of an at least partially quaternized tertiary amino-containing vinyl monomer. In this case, the proportion of each type of combined units in the copolymer is as follows: The proportion of combined units of the conjugated diene monomer is in the range of 80 to 99.99% by weight, preferably 85 to 99.95% by weight, and more preferably 90 to 99.9% by weight; and the proportion of combined units of the at least partially quaternized tertiary amino-containing vinyl monomer is in the range of 0.01 to 20% by weight, preferably 0.05 to 15% by weight, and more preferably 0.1 to 10% by weight. If the proportion of combined units of the at least partially quaternized tertiary amino-containing vinyl monomer is unduly low, heat build-up, tensile strength and abrasion resistance will not be sufficiently improved, while if it is unduly high, heat build-up, tensile strength and abrasion resistance will not be sufficiently improved owing to poor processability.

In order to achieve a highly balanced combination of heat build-up and wet skid resistance, there is used a copolymer composed of combined units of a conjugated diene monomer, combined units of an aromatic vinyl monomer, and combined units of an at least partially quaternized tertiary amino-containing vinyl monomer. In this case, the proportion of each type of combined units in the copolymer is as follows: The proportion of combined units of the conjugated diene monomer is in the range of 40 to 94.99% by weight, preferably 50 to 85% by weight, and more preferably 55 to 80% by weight; the proportion of combined units of the aromatic vinyl monomer is usually in the range of 5 to 55% by weight, preferably 10 to 45% by weight, and more preferably 15 to 40% by weight; and the proportion of combined units of the at least partially quaternized tertiary amino-containing vinyl monomer is in the range of 0.01 to 20% by weight, preferably 0.05 to 15% by weight, and more preferably 0.1 to 10% by weight. If the proportion of combined units of the at least partially quaternized tertiary amino-containing vinyl monomer is unduly low, heat build-up, tensile strength and abrasion resistance will not be sufficiently improved, while if it is unduly high, heat build-up, tensile strength and abrasion resistance will not be sufficiently improved owing to poor processability. If the proportion of combined units of the aromatic vinyl monomer is unduly high, heat build-up will not be sufficiently improved.

The degree of quaternization in the diene rubber of the present invention may be suitably chosen according to the purpose of use. However, the degree of quaternization is usually not less than 5 mole %, preferably in the range of 10 to 100 mole %, and more preferably 30 to 100 mole %, based on the total amount of tertiary amino groups present in the diene rubber. If an entirely unquaternized tertiary amino-containing diene rubber is used, the effect of improving heat build-up, tensile strength and abrasion resistance will not be satisfactorily achieved.

Moreover, according to the purpose of use, the proportion of combined units of the quaternized tertiary ammonium-containing vinyl monomer in the diene rubber of the present invention may be suitably chosen within the ranges described above for "the content of combined units of the at least partially quaternized tertiary amino-containing vinyl monomer" and "the degree of quaternization". However, when it is in the range of 0.01 to 20% by weight, preferably 0.05 to 15% by weight, and more preferably 0.1 to 10% by weight, heat build-up, tensile strength and abrasion resistance are balanced on a high level.

In the diene rubber of the present invention, no particular limitation is placed on the microstructure of the portions consisting of combined conjugated diene units, and the microstructure thereof may be suitably chosen according to the purpose of use. For example, the proportion of vinyl linkages (i.e., 1,2-vinyl and 3,4-vinyl linkages) in the portions consisting of combined conjugated diene units is usually in the range of 5 to 95%, preferably 7 to 50%, and more preferably 10 to 30%. When the proportion of vinyl linkages in the combined conjugated diene units is within this range, heat build-up characteristics and abrasion resistance are improved. The remaining conjugated diene linkage units other than vinyl linkages (i.e., 1,4-linkage units) may be either cis-1,4-linkages or trans-1,4-linkages.

The diene rubber of the present invention should have a Mooney viscosity ($ML_{1+4}$, 100° C.) of 1 to 200, preferably 20 to 150, and more preferably 25 to 120. If the Mooney viscosity is unduly low, no improvement in heat build-up and abrasion resistance will not be produced, while if it is unduly high, no improvement in processability will not be noted.

No particular limitation is placed on the process for preparing the diene rubber of the present invention. However, it is preferable to employ, for example, (a) a process which comprises copolymerizing a conjugated diene, or a conjugated diene and an aromatic vinyl, with a tertiary amino-containing vinyl monomer and subsequently reacting the resulting polymer with a monohalogenated hydrocarbon, or (b) a process which comprises copolymerizing a conjugated diene, or a conjugated diene and an aromatic vinyl, with a halogen-containing vinyl monomer and subsequently reacting the resulting polymer with a tertiary amine, because these processes permit quaternary ammonium groups to be efficiently introduced into the polymer molecule.

Specific examples of the conjugated diene, aromatic vinyl and tertiary amino-containing vinyl monomer used in the process (a) are the same as those described previously.

Examples of the halogen-containing vinyl monomer used in the process (b) include compounds of the general formula (5)

$$CH_2=CR^{19}-A_3-X_3 \qquad (5)$$

where $R^{19}$ is a hydrogen atom or a lower alkyl group, $A_3$ is an alkylene group, an arylene group, an arylene-alkylene group, an alkylene-arylene group, or a linking group of the general formula $-C(=O)-M-R^{20}-$ (in which M is an oxy group or an NH group, and $R^{20}$ is an alkylene group, an arylene group, an arylene-alkylene group or an alkylene-arylene group), and $X_3$ is a halogen atom. Specific examples of $R^{19}$, $A_3$, the general formula $-C(=O)-M-R^{20}-$, and $X_3$ are the same as the specific examples of $R_1$, $A_1$, the general formula $-C(=O)-M-R^5-$, and $X_1$ which have previously been described in connection with the general formula (1).

Among the halogen-containing vinyl monomers represented by the general formula (5), preferred examples thereof are compounds of the general formula (6)

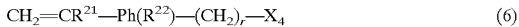

$$CH_2=CR^{21}-Ph(R^{22})-(CH_2)_r-X_4 \qquad (6)$$

where $R^{21}$ and $R^{22}$ are each a hydrogen atom or a lower alkyl group, $X_4$ is a halogen atom, and r is an integer of 1 to 6. Specific examples of $R^{21}$, $R^{22}$, $X_4$ and r are the same as the specific examples of $R^6$, $R^7$, $X_2$ and m which have previously been described in connection with the general formula (2).

Specific examples of the halogen-containing vinyl monomer include o-chloromethylstyrene, m-chloromethylstyrene, p-chloromethylstyrene, p-broromethylstyrene, p-iodomethylstyrene, p-chloroethylstyrene, p-bromoethylstyrene, m-iodomethylstyrene, p-chloropropylstyrene, p-bromopropylstyrene and p-iodobutylstyrene. Among them, o-chloromethylstyrene, m-chloromethylstyrene, p-chloromethylstyrene, p-broromethylstyrene and p-iodomethylstyrene are most preferred.

These halogen-containing vinyl monomers may be used alone or in admixture of two or more.

The amounts of monomers used may be suitably chosen according to the application of the desired diene rubber. Where a conjugated diene is copolymerized with a tertiary amino-containing vinyl monomer or a halogen-containing vinyl monomer, the conjugated diene is used in an amount of 80 to 99.99% by weight, preferably 85 to 99.95% by weight, and more preferably 90 to 99.9% by weight, based on the total amount of monomers; and the tertiary amino-containing vinyl monomer or halogen-containing vinyl monomer is used in an amount of 0.01 to 20% by weight, preferably 0.05 to 15% by weight, and more preferably 0.1 to 10% by weight, based on the total amount of monomers.

Where a conjugated diene and an aromatic vinyl are copolymerized with a tertiary amino-containing vinyl monomer or a halogen-containing vinyl monomer, the conjugated diene is used in an amount of 40 to 94.99% by weight, preferably 50 to 85% by weight, and more preferably 55 to 80% by weight, based on the total amount of monomers; the aromatic vinyl is used in an amount of 5 to 55% by weight, preferably 10 to 45% by weight, and more preferably 15 to 40% by weight, based on the total amount of monomers; and the tertiary amino-containing vinyl monomer or halogen-containing vinyl monomer is used in an amount of 0.01 to 20% by weight, preferably 0.05 to 15% by weight, and more preferably 0.1 to 10% by weight, based on the total amount of monomers.

Although no particular limitation is placed on the technique for copolymerizing the aforesaid monomers according to the process (a) or (b), emulsion polymerization is usually employed. For purposes of emulsion polymerization, any common emulsion polymerization process may be employed. One example thereof comprises emulsifying or dispersing specified amounts of the aforesaid monomers in an aqueous medium in the presence of an emulsifying agent and then effecting emulsion polymerization with the aid of a radical polymerization initiator.

As the emulsifying agent, there may be used, for example, a long-chain fatty acid salt of 10 or more carbon atoms and/or a rosinate. Specific examples thereof include potassium and sodium salts of capric acid, lauric acid, myristic acid, palmitic acid, oleic acid and stearic acid.

Examples of the radical polymerization initiator include persulfuric acid salts such as ammonium persulfate and potassium persulfate; and redox initiators such as a combination of ammonium persulfate and ferric sulfate, a combination of an organic peroxide and ferric sulfate, and a combination of hydrogen peroxide and ferric sulfate.

Moreover, a chain transfer agent may be added in order to regulate the molecular weight of the copolymer. Usable chain transfer agents include, for example, mercaptans such as t-dodecyl mercaptan and n-dodecyl mercaptan, α-methylstyrene dimer, carbon tetrachloride, thioglycollic acid, diterpene, terpinolene and γ-terpinenes.

The temperature for emulsion polymerization may be suitably chosen according to the type of the radical polymerization initiator used. However, it is usually in the range of 0 to 100° C. and preferably 0 to 60° C. The manner of polymerization may be either continuous polymerization or batch polymerization.

As the degree of conversion in emulsion polymerization becomes higher, the polymerization mixture tends to undergo gelation. Consequently, the degree of conversion is preferably controlled so as to be not greater than 90%. It is especially preferable to stop the polymerization at a degree of conversion in the range of 50 to 80%. The polymerization reaction is usually stopped by adding a polymerization stopper to the polymerization system when a predetermined degree of conversion is reached. Usable polymerization stoppers include, for example, amine compounds such as diethylhydroxylamine and hydroxylamine, and quinone compounds such as hydroquinone and benzoquinone; sodium nitrite; and sodium dithiocarbamate.

After the emulsion polymerization reaction is stopped, unreacted monomers are removed from the resulting polymer latex as required, and the pH of the latex is adjusted to a predetermined value as required by the addition of an acid such as nitric acid or sulfuric acid. Thereafter, quaternization may be carried out by adding a monohalogenated hydrocarbon [the process (a)] or a tertiary amine [the process (b)] to the reaction system.

As the monohalogenated hydrocarbon, there may be used, for example, a compound of the general formula (7)

$$R^{23}-X_5 \qquad (7)$$

where $R^{23}$ is an alkyl group, an aryl group or an aralkyl group and $X_5$ is a halogen atom. Specific examples of $R^{23}$ and $X_5$ are the same as the specific examples of $R^4$ and $X_1$ which have previously been described in connection with the general formula (1).

Specifically, suitable monohalogenated hydrocarbons include, for example, alkyl halides and benzyl halides, and alkyl halides are preferred. Among alkyl halides, lower alkyl halides are preferred and methyl halides are particularly preferred. Specific examples of the monohalogenated hydrocarbon include lower alkyl halides such as methyl chloride, methyl bromide, methyl iodide, ethyl chloride, ethyl bromide, ethyl iodide, propyl iodide, butyl iodide, butyl bromide and hexyl iodide; and benzyl halides such as benzyl chloride, benzyl bromide and benzyl iodide.

These monohalogenated hydrocarbons may be used alone or in admixture of two or more. The amount of monohalogenated hydrocarbon used to prepare the diene rubber of the present invention may be suitably chosen according to the type of the monohalogenated hydrocarbon and the reaction conditions. It is usually not less than 0.05 equivalent, preferably in the range of 0.1 to 10 equivalents, and more preferably 0.3 to 5 equivalents, based on the amount of tertiary amino groups contained in the diene polymer rubber. However, in order to prepare a diene rubber of the present invention in which the tertiary amino-containing vinyl monomer units are completely quaternized, the monohalogenated hydrocarbon is usually used in an amount of not less than 1 equivalent, preferably 1 to 10 equivalents, and more preferably 1.2 to 5 equivalents, based on the amount of tertiary amino groups contained in the diene polymer rubber.

As the tertiary amine, there may be used, for example, a compound of the general formula (8)

$$NR^{24}R^{25}R^{26} \qquad (8)$$

where $R^{24}$, $R^{25}$ and $R^{26}$ are each independently a lower alkyl group, an aryl group or an aralkyl group. Specific examples of $R^{24}$, $R^{25}$ and $R^{26}$ are the same as the specific examples of $R^2$, $R^3$ and $R^4$ which have previously been described in connection with the general formula (1).

These tertiary amines may be used alone or in admixture of two or more. The amount of tertiary amine used to prepare the diene rubber of the present invention may be suitably chosen according to the reaction conditions. However, it is usually not less than 1 equivalent, preferably in the range of 1 to 10 equivalents, and more preferably 1.2 to 5 equivalents, based on the amount of halogen atoms contained in the diene polymer rubber.

The quaternization reaction may be carried out in the usual manner. For example, this may be accomplished by adding the aforesaid monohalogenated hydrocarbon or tertiary amine to the polymerization mixture after completion of the polymerization reaction and then stirring the resulting reaction mixture. The reaction temperature is usually in the range of 0 to 90° C. and preferably 20 to 80° C., and the reaction time is usually in the range of 0.1 to 10 hours and preferably 0.5 to 5 hours.

After completion of the quaternization reaction, a coagulant comprising a salt such as sodium chloride, calcium chloride or potassium chloride is added to and mixed with the reaction mixture to coagulate and recover the polymer in the form of crumbs. These crumbs are washed, dehydrated and then dried with a band dryer or the like. Thus, the desired quaternary ammonium-containing diene rubber can be obtained.

The achievement of quaternization may be confirmed in the usual manner. For example, this may be accomplished by ultraviolet (UV) absorption spectroscopy or a qualitative analysis using quinhydrone.

Rubber Component

In the rubber compositions of the present invention, a rubber component containing the aforesaid diene rubber is used. The proportion of the diene rubber in the rubber component may be suitably chosen according to the purpose of use. However, it is usually not less than 10% by weight, preferably in the range of 15 to 100% by weight, more preferably 20 to 100% by weight, and most preferably 25 to 100% by weight. If the proportion of the diene rubber of the present invention in the rubber component is unduly low, a sufficient improvement in properties will not be achieved.

No particular limitation is placed on the type of other rubbers which can be used in combination. However, diene rubbers are usually used. Examples of the diene rubbers include natural rubber (NR), polyisoprene rubber (IR), emulsion-polymerized styrene-butadiene copolymer rubber (SBR), solution-polymerized random SBR (containing 5 to 50% by weight of bound styrene and having a 1,2-vinyl linkage content of 10 to 80% in the portions consisting of combined butadiene units), high-trans SBR (having a 1,4-trans-linkage content of 70 to 95% in the portions consisting of combined butadiene units), low-cis polybutadiene rubber (BR), high-cis BR, high-trans BR (having a 1,4-trans-linkage content of 70 to 95% in the portions consisting of combined butadiene units), styrene-isoprene copolymer rubber (SIR), butadiene-isoprene copolymer rubber, solution-polymerized random styrene-butadiene-isoprene copolymer rubber (SIBR), emulsion-polymerized SIBR, emulsion-polymerized styrene-acrylonitrile-butadiene copolymer rubber, acrylonitrile-butadiene copolymer rubber, high-vinyl SBR/low-vinyl SBR block copolymer rubber, and polystyrene-polybutadiene-polystyrene block copolymer rubber. Among them, NR, BR, IR, SBR and SIBR are preferred; and NR, BR and SBR are particularly preferred. These other diene rubbers may be used alone or in admixture of two or more.

Reinforcing Agent

No particular limitation is placed on the type of the reinforcing agent. For example, silica and carbon black may be used.

No particular limitation is placed on the type of silica. Examples thereof include dry process white carbon, wet process white carbon, colloidal silica, and precipitated silica as disclosed in Japanese Patent Laid-Open No. 62838/'87. Among them, wet process white carbon consisting essentially of hydrated silica is particularly preferred. These silicas may be used alone or in admixture of two or more.

No particular limitation is placed on the specific surface area of silica. However, the nitrogen adsorption specific surface area (measured by the BET method) of silica should usually be in the range of 50 to 400 m²/g, preferably 100 to 220 m²/g, and more preferably 120 to 190 m²/g, because sufficient improvements in reinforcing power, abrasion resistance and heat build-up are achieved in such a case. The nitrogen adsorption specific surface area is measured by the BET method according to ASTM D3037-81.

No particular limitation is placed on the type of carbon black, However, usable carbon blacks include furnace black, acetylene black, thermal black, channel black and graphite. Among them, furnace black is particularly preferred. Specific examples thereof include products of various grades such as SAF, ISAF, ISAF-HF, ISAF-LS, IISAF-HS, HAF, HAF-HS, HAF-LS and FEF. These carbon blacks may be used alone or in admixture of two or more.

No particular limitation is placed on the nitrogen adsorption specific surface area ($N_2SA$) of carbon black. However, when it is usually in the range of 5 to 200 m$^2$/g, preferably 50 to 150 m$^2$/g, and more preferably 80 to 130 m$^2$/g, tensile strength and abrasion resistance are improved to a high degree. Moreover, no particular limitation is placed on the DBP adsorption level of carbon black. However, when it is usually in the range of 5 to 300 ml/100 g, preferably 50 to 200 ml/100 g, and more preferably 80 to 160 ml/100 g, tensile strength and abrasion resistance are improved to a high degree.

Abrasion resistance can further be improved by using high-structure carbon black which is disclosed in Japanese Patent Laid-Open No. 230290/'93, i.e., carbon black characterized by a cetyltrimethylammonium bromide (CTAB) adsorption specific surface area of 110 to 170 m$^2$/g and a DBP (24M4DBP) adsorption level of 110 to 130 ml/100 g after being repeatedly compressed four times under a pressure of 24,000 psi.

The amount of reinforcing agent used is in the range of 10 to 200 parts by weight, preferably 20 to 150 parts by weight, and more preferably 30 to 120 parts by weight, per 100 parts by weight of the rubber component.

In order to accomplish the objects of the present invention to the fullest extent, it is preferable to use, as the reinforcing agent, silica alone or a combination of silica and carbon black. When a combination of silica and carbon black is used, the mixing ratio thereof may be suitably chosen according to the intended application or purpose. However, the weight ratio of silica to carbon black is usually in the range of 10:90 to 99:1, preferably 30:70 to 95:5, and more preferably 50:50 to 90:10.

Silane Coupling Agent

Where silica is used as the reinforcing agent in the present invention, heat build-up and abrasion resistance can further be improved by the combined use of a silane coupling agent.

No particular limitation is placed on the type of the silane coupling agent. Examples thereof include vinyltrichlorosilane, vinyltriethoxysilane, vinyltris-(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane and bis[3-(triethoxysilyl)propyl] tetrasulfide, as well as the tetrasulfides described in Japanese Patent Laid-Open No. 248116/'94, including γ-trimethoxysilylpropyl dimethylthiocarbamyl tetrasulfide and γ-trimethoxysilylpropyl benzothiazyl tetrasulfide.

These silane coupling agents may be used alone or in admixture of two or more. The amount of silane coupling agent used is usually in the range of 0.1 to 30 parts by weight, preferably 1 to 20 parts by weight, and more preferably 2 to 10 parts by weight, per 100 parts by weight of silica.

Rubber Compositions

In the usual manner, the rubber compositions of the present invention may contain, in addition to the above-described components, desired amounts of other compounding ingredients such as vulcanizing agents, vulcanization accelerators, vulcanization activators, antioxidants, activators, plasticizers, lubricants and fillers.

No particular limitation is placed on the type of the vulcanizing agent. Examples thereof include sulfur such as powdered sulfur, precipitated sulfur, colloidal sulfur, insoluble sulfur and highly dispersible sulfur; sulfur halides such as sulfur monochloride and sulfur dichloride; organic peroxides such as dicumyl peroxide and di-tert-butyl peroxide; quinone dioximes such as p-quinone dioxime and p,p'-dibenzoylquinone dioxime; organic multivalent amine compounds such as triethylenetetramine, hexamethylenediamine carbamate and 4,4'-methylenebis-o-chloroaniline; and alkylphenol resins having a methylol group. Among them, sulfur is preferred, and powdered sulfur is particularly preferred. These vulcanizing agents may be used alone or in admixture of two or more.

The amount of vulcanizing agent used is usually in the range of 0.1 to 15 parts by weight, preferably 0.3 to 10 parts by weight, and more preferably 0.5 to 5 parts by weight, per 100 parts by weight of the rubber component. When the amount of vulcanizing agent used is in this range, there can be obtained a vulcanized product which is excellent not only in tensile strength and abrasion resistance, but also in properties such as heat resistance and residual strain.

Examples of the vulcanization accelerators include sulfenamide type vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; guanidine type vulcanization accelerators such as diphenylguanidine, di-o-tolylguanidine and o-tolylbiguanidine; thiourea type vulcanization accelerators such as thiocarbanilide, di-o-tolylthiourea, ethylenethiourea, diethylthiourea and trimethylthiourea; thiazole type vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram type vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamate type vulcanization accelerators such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethyldithiocarbamic acid diethylamine salt, pentamethylenedithiocarbamic acid piperidine salt and methylpentamethylenedithiocarbamic acid pipecoline salt; and xanthogenate type vulcanization accelerators such as sodium isopropylxanthogenate, zinc isopropylxanthogenate and zinc butylxanthogenate.

These vulcanization accelerators may be used alone or in admixture of two or more. However, it is especially preferable to use a vulcanization accelerator containing at least a sulfenamide vulcanization accelerator. The amount of vulcanization accelerator used is usually in the range of 0.1 to 15 parts by weight, preferably 0.3 to 10 parts by weight, and more preferably 0.5 to 5 parts by weight, per 100 parts by weight of the rubber component.

No particular limitation is placed on the type of the vulcanization activator. For example, higher fatty acids (e.g., stearic acid) and zinc oxide may be used. In the case of zinc oxide, it is preferable to use zinc oxide having a particle size of, for example, not greater than 5 $\mu$m and hence high surface activity. Specific examples thereof include active zinc flour having a particle size of, for example, 0.05 to 0.2 $\mu$m and zinc oxide having a particle size of, for example, 0.3 to 1 $\mu$m. Moreover, zinc oxide treated with an amine type dispersing agent or wetting agent may also be used.

These vulcanization activators may be used alone or in admixture of two or more. The amount of vulcanization activator used may be suitably chosen according to the type of the vulcanization activator. When a higher fatty acid is used, its amount used is usually in the range of 0.05 to 15 parts by weight, preferably 0.1 to 10 parts by weight, and more preferably 0.5 to 5 parts by weight, per 100 parts by weight of the rubber component. When zinc oxide is used, its amount used is usually in the range of 0.05 to 10 parts by weight, preferably 0.1 to 5 parts by weight, and more preferably 0.5 to 2 parts by weight, per 100 parts by weight of the rubber component. When the amount of zinc oxide used is in this range, a highly balanced combination of properties such as processability, tensile strength and abrasion resistance is achieved.

Examples of other compounding ingredients include coupling agents other than silane coupling agents; activators such as diethylene glycol, polyethylene glycol and silicone oil; fillers such as calcium carbonate, talc and clay; process oils; and waxes.

The rubber compositions of the present invention can be obtained by kneading a mixture of various ingredients in the usual manner. For example, the rubber compositions can be obtained by mixing the rubber component with compounding ingredients other than the vulcanizing agent and the vulcanization accelerator, and then incorporating the vulcanizing agent and the vulcanization accelerator into the resulting mixture. The temperature at which the rubber component is mixed with the compounding ingredients other than the vulcanizing agent and the vulcanization accelerator is usually in the range of 80 to 200° C., preferably 100 to 190° C., and more preferably 140 to 180° C. The mixing time is usually not less than 30 seconds and preferably in the range of 1 to 30 minutes. After the resulting mixture is usually cooled to 100° C. or below and preferably to a temperature ranging from room temperature to 80° C., the vulcanizing agent and the vulcanization accelerator are incorporated thereinto. Thus, there is obtained a rubber composition in accordance with the present invention. Then, this rubber composition may usually be press-cured at a temperature of 120 to 200° C. and preferably 140 to 180° C. to obtain a vulcanized rubber having improved properties which are desired in the present invention.

BEST MODE FOR CARRYING OUT THE INVENTION

The present invention is more specifically described with reference to the following preparation examples, examples and comparative examples. In these examples, all parts and percentages are by weight unless otherwise stated.

Various properties were measured according to the following methods.

(1) The content of combined styrene units in a copolymer was determined according to JIS K6383 (the refractive index method).

(2) The proportion of vinyl linkages in the combined butadiene units of a copolymer was determined by infrared spectroscopy (the Hampton method).

(3) The content of tertiary amino-containing combined monomer units in a copolymer was determined by dissolving the copolymer in tetrahydrofuran, subjecting this solution twice to a reprecipitation/coagulation treatment with methanol/acetone (50/50% by volume), drying the resulting precipitate in vacuo, and analyzing it by 500 MHz $^1$H-NMR.

(4) The presence of quaternary ammonium groups was confirmed by UV absorption spectroscopy at 365 nm.

(5) Mooney viscosity ($ML_{1+4}$, 100° C.) was measured according to JIS K6301.

(6) As to tensile strength, modulus at 300% stress (in Kgf/cm$^2$) was measured according to JIS K6301.

(7) As to heat build-up, tan $\delta$ at 1% torsion, 20 Hz and 60 C was measured with an RDA-II (manufactured by Rheometrics Co.). This property was expressed in terms of an index number [i.e., tan $\delta$ 60° C. index=(tan $\delta$ of the control part)/(tan $\delta$ of the test part)]. Greater values of this index number indicate more desirable heat build-up characteristics.

(8) Abrasion resistance was measured with a pico abrasion tester according to ASTM D2228. This property was expressed in terms of an index number [i.e., abrasion resistance index=(abrasion loss of the control part)/(abrasion loss of the test part)]. Greater values of this index number indicate more desirable abrasion resistance.

Preparation Examples 1–7 and Comparative Preparation

Examples 1–3

A tank fitted with a stirrer was charged with 200 parts of water, 3 parts of rosin soap, 0.2 part of t-dodecyl mercaptan, and each of the monomer compositions shown in Table 1. While the temperature of the reactor was maintained at 5° C., polymerization was initiated by the addition of a radical polymerization initiator comprising 0.1 part of cumene hydroperoxide, 0.2 part of sodium formaldehyde sulfoxylate and 0.01 part of ferric sulfate. When the degree of conversion reached 70%, the reaction was stopped by the addition of diethylhydroxylamine. Then, unreacted monomers were recovered, and the reactant (i.e., halogenated hydrocarbon or tertiary amine) shown in Table 1 was added and reacted at 50° C. for 30 minutes. The resulting polymer was coagulated with sulfuric acid and sodium chloride to form crumbs, followed by drying with a crumb dryer. Thus, diene rubber Nos. 1–10 were obtained. The presence of quaternary ammonium groups in each diene rubber was confirmed by UV absorption spectroscopy at 365 nm, and properties of each polymer are shown in Table 1. In diene rubber Nos. 1–10, the content of 1,2-vinyl linkages in the portions consisting of combined butadiene units was 17–18%.

TABLE 1

| Example No. | Compar. Prep. Example 1 | Preparation Example 1 | Preparation Example 2 | Preparation Example 3 | Preparation Example 4 | Compar. Prep. Example 2 | Preparation Example 5 | Preparation Example 6 | Preparation Example 7 | Compar. Prep. Example 3 |
|---|---|---|---|---|---|---|---|---|---|---|
| Diene rubber No. | 1 | 2 | 3 | 4 | 5 | 6 | 7 | 8 | 9 | 10 |
| Amount charged (parts) | | | | | | | | | | |
| Butadiene | 60.0 | 60.0 | 60.0 | 60.0 | 60.0 | 60.0 | 60.0 | 60.0 | 60.0 | 60.0 |
| Styrene | 38.5 | 38.5 | 38.5 | 38.5 | 38.5 | 38.5 | 38.2 | 38.0 | 37.5 | 40.0 |
| DMAST (*1) | 1.5 | 1.5 | 1.5 | 1.5 | 1.5 | 1.5 | — | — | — | — |
| DMAPAA (*2) | — | — | — | — | — | — | 0.8 | — | — | — |
| 2VP (*3) | — | — | — | — | — | — | — | 2 | — | — |
| VBC (*4) | — | — | — | — | — | — | — | — | 2.5 | — |
| Content (wt. %) | | | | | | | | | | |
| Styrene | 31.2 | 31.2 | 31.2 | 31.2 | 31.2 | 31.2 | 31.3 | 30.6 | 31.2 | 32.4 |
| Functional group containing monomer | 1.2 | 1.2 | 1.2 | 1.2 | 1.2 | 1.2 | 0.4 | 2.2 | 1.3 | — |
| Reactant (parts) | | | | | | | | | | |
| Methyl iodide | — | 0.15 | 0.6 | 1.2 | 0.15 | — | 0.5 | 1 | — | — |
| Butyl iodide | — | — | — | — | — | — | — | — | — | — |
| BADM (*5) | — | — | — | — | — | 3.6 | — | — | — | — |
| Trimethylamine | — | — | — | — | — | — | — | — | 2.2 | — |
| Ratio of quaternizing agent (*6) | 0 | 0.14 | 0.58 | 1.16 | 0.14 | 1.20 | 0.34 | 1.14 | 1.00 | — |
| Tertiary/quaternary (*7) | 3 | ¾ | ¾ | 4 | 4 | 4 | ¾ | 4 | 4 | — |
| Mooney viscosity (ML$_{1+4}$, 100° C.) | 50 | 51 | 54 | 52 | 62 | 60 | 62 | 55 | 55 | 55 |

(*1) p-N,N-Dimethylaminomethylstyrene.
(*2) N,N-Dimethylaminopropylacrylamide.
(*3) 2-Vinylpyridine.
(*4) p-Chloromethylstyrene.
(*5) 4,4'-Bis(bromoacetyl)diphenylmethane.
(*6) The equivalent ratio of halogen atoms in the halide to tertiary amino groups in the rubber.
(*7) "Tertiary" means tertiary amino groups and "quaternary" means quaternary ammonium groups. Complete quaternization was confirmed by examining the disappearance of tertiary amino groups by NMR and the formation of quaternary ammonium groups by UV absorption spectroscopy at 365 nm.

Formulation Examples 1–9 and Comparative Formulation Examples 1–2

Each of diene rubber Nos. 1–9 prepared in the foregoing Preparation Examples was used as raw rubber. According to the formulation shown in Table 2 (i.e., Formulation 1), all of the raw rubber, half of silica, half of the silane coupling agent, and all of stearic acid were mixed at 170° C. for 2 minutes in a Brabender type mixer having a capacity of 250 ml. Then, the remaining compounding ingredients, except sulfur and the vulcanization accelerator, were added and this mixture was kneaded at the same temperature for 3 minutes.

Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 3.

TABLE 2

| Formulation 1 | First time | Second time | Third time |
|---|---|---|---|
| Raw rubber | 100 | — | — |
| Silica | 40 | 40 | — |
| Silane coupling agent (*1) | 3 | 3 | — |
| Stearic acid | 2 | — | — |
| Aromatic oil | — | 30 | — |
| Antioxidant (*2) | — | 1 | — |
| Zinc oxide (*3) | — | Variable | — |
| Sulfur | — | — | 1.75 |
| Vulcanization accelerator (*4) | — | — | 3.5 |

(*1) Si 69 (manufactured by Degussa Co.).
(*2) Nocrac 6C (manufactured by Oouchi Shinko Co., Ltd.).
(*3) Zinc Oxide #1 (manufactured by Honsho Chemical Co., Ltd.; particle size = 0.4 μm).
(*4) Nocceler CZ (manufactured by Oouchi Shinko Co., Ltd.).

TABLE 3

|  | Formulation Example | | | | | | | | | Comparative Formulation Example | |
|---|---|---|---|---|---|---|---|---|---|---|---|
| Example No. | 1 | 2 | 3 | 4 | 5 | 6 | 7 | 8 | 9 | 1 | 2 |
| Rubber component (parts) | | | | | | | | | | | |
| Diene rubber No. 1 | — | — | — | — | — | — | — | — | — | 100 | — |
| Diene rubber No. 2 | 100 | — | — | — | — | — | — | — | — | — | — |
| Diene rubber No. 3 | — | 100 | 100 | 100 | — | — | — | — | — | — | — |
| Diene rubber No. 4 | — | — | — | — | 100 | — | — | — | — | — | — |
| Diene rubber No. 5 | — | — | — | — | — | 100 | — | — | — | — | — |
| Diene rubber No. 6 | — | — | — | — | — | — | — | — | — | — | 100 |
| Diene rubber No. 7 | — | — | — | — | — | — | 100 | — | — | — | — |
| Diene rubber No. 8 | — | — | — | — | — | — | — | 100 | — | — | — |
| Diene rubber No. 9 | — | — | — | — | — | — | — | — | 100 | — | — |
| Compounding ingredients (parts) | | | | | | | | | | | |
| Silica (*1) | 80 | 80 | 80 | — | 80 | 80 | 80 | 80 | 80 | — | — |
| Silica (*2) | — | — | — | 80 | — | — | — | — | — | 80 | 80 |
| Zinc oxide | 1.5 | 1.5 | 3 | 3 | 1.5 | 1.5 | 1.5 | 1.5 | 1.5 | 3 | 3 |
| 300% stress (Kgf/cm$^2$) | 128 | 136 | 138 | 124 | 142 | 139 | 153 | 146 | 140 | 117 | 138 |
| tan δ 60° C. index (*3) | 118 | 122 | 118 | 116 | 134 | 132 | 144 | 137 | 140 | 100 | 85 |
| Abrasion resistance index (*3) | 122 | 128 | 122 | 111 | 135 | 133 | 144 | 130 | 127 | 100 | 77 |

(*1) Z1165 MP (manufactured by Rhone-Poulenc Co.; nitrogen adsorption specific surface area = 175 m$^2$/g).
(*2) Nibsil VN3 (manufactured by Nippon Silica Co. Ltd.; nitrogen adsorption specific surface area = 240 m$^2$/g).
(*3) These indices are expressed by taking the values of Comparative Formulation Example 1 as 100.

It can be seen from the results shown in Table 3 that, in the rubber compositions using an at least partially quaternized tertiary amino-containing diene rubber in accordance with the present invention (Formulation Examples 1–9), all properties including tensile strength, heat build-up and abrasion resistance are highly improved. It can also be seen that, when the degree of quaternization of tertiary amino groups is 14 mole % (Formulation Example 1; the content of the quaternary ammonium-containing vinyl monomer in the diene rubber is 0.0168% by weight), 34 mole % (Formulation Example 7; the content of the quaternary ammonium-containing vinyl monomer in the diene rubber is 0.136% by weight) or 58 mole % (Formulation Examples 2–4; the content of the quaternary ammonium-containing vinyl monomer in the diene rubber is 0.696% by weight), tensile strength, heat build-up and abrasion resistance are sufficiently improved, and that, when the degree of quaternization is 100% (Formulation Examples 5, 6, 8 and 9), these three properties are improved on a very high level. Moreover, a comparison of Formulation Examples 5 and 6 reveals that, when a lower alkyl halide is used, all of tensile strength, heat build-up and abrasion resistance are more effectively improved. Furthermore, it can also be seen that tensile strength, heat build-up and abrasion resistance are further improved by using silica having a small specific surface area (by comparison of Formulation Examples 3 and 4) and that all of tensile strength, heat build-up and abrasion resistance are further improved by using zinc oxide in an amount of not greater than 2 parts by weight per 100 parts by weight of the rubber component (by comparison of Formulation Examples 2 and 3). In contrast, it can be seen that, when a diene rubber obtained by reacting a tertiary ammonium-containing diene rubber with a crosslinking agent comprising a dihalide is used (Comparative Formulation Example 2), tensile strength is improved, but heat build-up and abrasion resistance become worse.

Formulation Examples 10–13 and Comparative Formulation Example 3

Using each of the raw rubbers shown in Table 5, the following procedure was performed according to Formulation 2 shown in Table 4. First of all, all of the raw rubber, half of silica, half of the silane coupling agent, and all of stearic acid were placed in a Banbury mixer having a capacity of 250 ml, and kneaded at 160° C. for 2 minutes. Then, the remaining compounding ingredients, except sulfur and the vulcanization accelerator, were added and this mixture was kneaded at the same temperature for 3 minutes. Subsequently, the resulting mixture, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 5.

TABLE 4

| Formulation 2 | First time | Second time | Third time |
|---|---|---|---|
| Raw rubber | 100 | — | — |
| Silica (*1) | Half | Half | — |
| Carbon black (*2) | — | All | — |
| Silane coupling agent (*3) | Half | Half | — |
| Stearic acid | 2 | — | — |
| Aromatic oil | — | 25 | — |
| Antioxidant (*4) | — | 1 | — |
| Zinc oxide (*5) | — | 1.5 | — |
| Sulfur | — | — | 1.8 |
| Vulcanization accelerator (*6) | — | — | 3 |

(*1) Z1165 MP (manufactured by Rhone-Poulenc Co.).
(*2) Seast KH (manufactured by Tokai Carbon Co., Ltd.).
(*3) Si 69 (manufactured by Degussa Co.).
(*4) Nocrac 6C (manufactured by Oouchi Shinko Co., Ltd.).
(*5) Zinc Oxide #1 (manufactured by Honsho Chemical Co., Ltd.; particle size = 0.4 μm).
(*6) Nocceler CZ (manufactured by Oouchi Shinko Co., Ltd.).

TABLE 5

|  | Formulation Example |  |  |  | Comparative Formulation |
|---|---|---|---|---|---|
| Examaple No. | 10 | 11 | 12 | 13 | Example 3 |
| Rubber component (parts) | | | | | |
| Diene rubber No. 7 | 100 | 80 | 60 | 40 | — |
| Diene rubber No. 10 | — | — | — | — | 80 |
| BR 1220 (*1) | — | 20 | 40 | — | 20 |
| Natural rubber (*2) | — | — | — | 60 | — |
| Compounding ingredients (parts) | | | | | |
| Silica | 50 | 80 | 80 | 80 | 80 |
| Carbon black | 30 | — | — | — | — |
| Silane coupling agent | 3.75 | 6 | 6 | 6 | 6 |
| 300% stress (Kgf/cm$^2$) | 160 | 148 | 139 | 149 | 98 |
| tan δ 60° C. index (*3) | 123 | 138 | 136 | 129 | 100 |
| Abrasion resistance index (*3) | 151 | 146 | 141 | 138 | 100 |

(*1) Polybutadiene (manufactured by Nippon Zeon Co., Ltd.).
(*2) RSS No. 3.
(*3) These indices are expressed by taking the values of Comparative Formulation Example 1 as 100.

It can be seen from the results shown in Table that, in the rubber compositions of the present invention, all of tensile strength, heat build-up and abrasion resistance are sufficiently improved even when a combination of silica and carbon black is used as the reinforcing agent (Formulation Example 10). Moreover, it can also be seen that tensile strength, heat build-up and abrasion resistance are highly balanced even when a combination of a diene rubber in accordance with the present invention and another diene rubber is used as the rubber component (Formulation Examples 11–13).

Preparation Examples 8–12 and Comparative Preparation Examples 4–6

A tank fitted with a stirrer was charged with 200 parts of water, 3 parts of rosin soap, 0.2 part of t-dodecyl mercaptan, and each of the monomer compositions shown in Table 6. While the temperature of the reactor was maintained at 5° C., polymerization was initiated by the addition of a radical polymerization initiator comprising 0.1 part of cumene hydroperoxide, 0.2 part of sodium formaldehyde sulfoxylate and 0.01 part of ferric sulfate. When the degree of conversion reached 70%, the reaction was stopped by the addition of diethylhydroxylamine. Then, unreacted monomers were recovered, and the monohalide shown in Table 6 was added and reacted at 50° C. for 30 minutes. The resulting polymer was coagulated with sulfuric acid and sodium chloride to form crumbs, followed by drying with a crumb dryer. Thus, diene rubber Nos. 11–18 were obtained. The presence of quaternary ammonium groups in each diene rubber was confirmed by UV absorption spectroscopy at 365 nm, and properties of each polymer are shown in Table 1. In diene rubber Nos. 11–18, the content of 1,2-vinyl linkages in the portions consisting of butadiene units was 17–18%.

TABLE 6

| Example No. | Preparation Example 8 | Compar. Prep. Example 4 | Preparation Example 9 | Preparation Example 10 | Compar. Prep. Example 5 | Preparation Example 11 | Preparation Example 12 | Compar. Prep. Example 6 |
|---|---|---|---|---|---|---|---|---|
| Diene rubber No. | 11 | 12 | 13 | 14 | 15 | 16 | 17 | 18 |
| Amount charged (parts) | | | | | | | | |
| Butadiene | 60.0 | 60.0 | 60.0 | 60.0 | 60.0 | 75.0 | 75.0 | 60.0 |
| Styrene | 39.5 | 38.5 | 38.5 | 38.5 | 38.5 | 24.0 | 18.0 | 40.0 |
| DMAST (*1) | 1.0 | — | — | — | — | — | — | — |
| DMAPAA (*2) | — | 1.5 | 1.5 | 1.5 | 1.5 | — | — | — |
| 2VP (*3) | — | — | — | — | — | 1.0 | 7.0 | — |
| Halide (parts) | | | | | | | | |
| Methyl iodide | 1.4 | — | 1.2 | — | — | 1.9 | 19.7 | 2.0 |
| Butyl iodide | — | — | — | 1.6 | — | — | — | — |
| BADM (*4) | — | — | — | — | 3.8 | — | — | — |
| Tertiary/quaternary (*5) | Quaternary | Tertiary | Quaternary | Quaternary | Quaternary | Quaternary | Quaternary | — |
| Content (wt. %) | | | | | | | | |
| Styrene | 31.6 | 31.4 | 31.2 | 31.3 | 31.5 | 18.2 | 13.5 | 32.4 |
| Amino-containing monomer | 0.8 | 0.7 | 0.7 | 0.7 | 0.7 | 0.7 | 7.3 | — |
| Mooney viscosity (ML$_{1+4}$, 100° C.) | 50 | 51 | 54 | 52 | 62 | 60 | 62 | 55 |

(*1) p-N,N-Dimethylaminomethylstyrene.
(*2) N,N-Dimethylaminopropylacrylamide.
(*3) 2-Vinylpyridine.
(*4) 4,4'-Bis(bromoacetyl)diphenylmethane.
(*5) "Tertiary" means tertiary amino groups and "quaternary" means quaternary ammonium groups (the presence of which was confirmed by UV absorption spectroscopy at 365 nm).

Formulation Examples 14–19 and Comparative Formulation Examples 4–5

Each of diene rubber Nos. 11–15 and 17 prepared in the foregoing Preparation Examples was used as raw rubber.

According to the formulation shown in Table 7 (i.e., Formulation 3), all of the raw rubber, half of silica, half of the silane coupling agent, and all of stearic acid were mixed at 170° C. for 2 minutes in a Brabender type mixer having a capacity of 250 ml. Then, the remaining compounding ingredients, except zinc oxide, sulfur and the vulcanization accelerator, were added and this mixture was kneaded at the same temperature for 3 minutes. The amounts of raw rubber, silica and zinc oxide used are shown in Table 9.

Subsequently, the resulting mixture, zinc oxide, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 8.

TABLE 7

| Formulation 3 | First time | Second time | Third time |
|---|---|---|---|
| Raw rubber | All | — | — |
| Silica | Half | Half | — |
| Silane coupling agent (*1) | 2.5 | 2.5 | — |
| Aromatic oil | — | 30 | — |
| Stearic acid | 2 | — | — |
| Antioxidant (*2) | — | 1 | — |
| Zinc oxide (*3) | — | — | Variable |
| Sulfur | — | — | 2 |
| Vulcanization accelerator (*4) | — | — | 3.5 |

(*1) Si 69 (manufactured by Degussa Co.).
(*2) Nocrac 6C (manufactured by Oouchi Shinko Co., Ltd.).
(*3) Zinc Oxide #1 (manufactured by Honsho Chemical Co., Ltd.; particle size = 0.4 μm).
(*4) Nocceler CZ (manufactured by Oouchi Shinko Co., Ltd.).

using a tertiary ammonium-containing diene rubber (Comparative Formulation Example 4). Moreover, a comparison of Formulation Examples 15 and 18 reveals that, when a lower alkylating agent (monohalide) is used, all of tensile strength, heat build-up and abrasion resistance are more effectively improved. Furthermore, it can also be seen that all of tensile strength, heat build-up and abrasion resistance are balanced on a high level by using silica having a small specific surface area (Formulation Examples 14, 15, 18 and 19), and that these properties are further improved by using zinc oxide in an amount of not greater than 2 parts by weight per 100 parts by weight of the rubber component (by comparison of Formulation Examples 15 and 16). In contrast, it can be seen that, when a diene rubber obtained by reacting a tertiary ammonium-containing diene rubber with a crosslinking agent comprising a dihalide is used (Comparative Formulation Example 5), tensile strength is improved, but heat build-up and abrasion resistance become worse.

Formulation Examples 20–23 and Comparative Formulation

Example 6

Using each of the raw rubbers shown in Table 10, the following procedure was performed according to Formulation 4 shown in Table 9. First of all, all of the raw rubber, half of silica, half of the silane coupling agent, and all of stearic acid were placed in a Banbury mixer having a capacity of 250 ml, and kneaded at 160° C. for 2 minutes. Then, the remaining compounding ingredients, except zinc oxide, sulfur and the vulcanization accelerator, were added and this mixture was kneaded at the same temperature for

TABLE 8

| | Formulation Example | | | | | | Comparative Formulation Example | |
|---|---|---|---|---|---|---|---|---|
| Example No. | 14 | 15 | 16 | 17 | 18 | 19 | 4 | 5 |
| Rubber component (parts) | | | | | | | | |
| Diene rubber No. 11 | 100 | — | — | — | — | — | — | — |
| Diene rubber No. 12 | — | — | — | — | — | — | 100 | — |
| Diene rubber No. 13 | — | 100 | 100 | 100 | — | — | — | — |
| Diene rubber No. 14 | — | — | — | — | 100 | — | — | — |
| Diene rubber No. 15 | — | — | — | — | — | — | — | 100 |
| Diene rubber No. 17 | — | — | — | — | — | 100 | — | — |
| Compounding ingredients (parts) | | | | | | | | |
| Silica (*1) | 80 | 80 | 80 | — | 80 | 80 | — | — |
| Silica (*2) | — | — | — | 80 | — | — | 80 | 80 |
| Zinc oxide | 1.5 | 1.5 | 3 | 3 | 1.5 | 1.5 | 3 | 3 |
| 300% stress (Kgf/cm$^2$) | 152 | 164 | 152 | 138 | 155 | 171 | 121 | 143 |
| tan δ 60° C. index (*3) | 114 | 121 | 116 | 112 | 116 | 121 | 100 | 88 |
| Abrasion resistance index (*3) | 129 | 136 | 128 | 116 | 131 | 151 | 100 | 75 |

(*1) Z1165 MP (manufactured by Rhone-Poulenc Co.; nitrogen adsorption specific surface area 175 m$^2$/g).
(*2) Nibsi VN3 (manufactured by Nippon Silica Co., Ltd.; nitrogen adsorption specific surface area = 240 m$^2$/g).
(*3) These indices are expressed by taking the values of Comparative Formulation Example 1 as 100.

It can be seen from the results shown in Table 8 that, in the rubber compositions using a quaternary ammonium-containing diene rubber in accordance with the present invention (Formulation Examples 14–19), all of tensile strength, heat build-up and abrasion resistance are sufficiently improved as compared with the rubber composition 2.5 minutes. Subsequently, the resulting mixture, zinc oxide, sulfur and the vulcanization accelerator were added to an open roll mill kept at 50° C., and kneaded therein. Thereafter, specimens were prepared by press curing at 160° C. for 30 minutes and used to measure various properties. The results thus obtained are shown in Table 10.

TABLE 9

| Formulation 4 | First time | Second time | Third time |
|---|---|---|---|
| Raw rubber | All | — | — |
| Silica (*1) | Half | Half | — |
| Carbon black (*2) | — | All | — |
| Silane coupling agent (*3) | Half | Half | — |
| Aromatic oil | — | 25 | — |
| Stearic acid | 2 | — | — |
| Antioxidant (*4) | — | 1 | — |
| Zinc oxide (*5) | — | — | 1.5 |
| Sulfur | — | — | 2 |
| Vulcanization accelerator (*6) | — | — | 3 |

(*1) Z1165 MP (manufactured by Rhone-Poulenc Co.).
(*2) Seast KH (manufactured by Tokai Carbon Co., Ltd.).
(*3) Si 69 (manufactured by Degussa Co.).
(*4) Nocrac 6C (manufactured by Oouchi Shinko Co., Ltd.).
(*5) Zinc Oxide #1 (manufactured by Honsho Chemical Co., Ltd.; particle size = 0.4 μm).
(*6) Nocceler CZ (manufactured by Oouchi Shinko Co., Ltd.).

TABLE 10

| | Formulation Example | | | | Comparative Formulation |
|---|---|---|---|---|---|
| Examaple No. | 20 | 21 | 22 | 23 | Example 6 |
| Rubber component (parts) | | | | | |
| Diene rubber No. 16 | 100 | 80 | 60 | 40 | — |
| Diene rubber No. 18 | — | — | — | — | 80 |
| BR 1220 (*1) | — | 20 | 40 | — | 20 |
| Natural rubber (*2) | — | — | — | 60 | — |
| Compounding ingredients (parts) | | | | | |
| Silica | 50 | 70 | 70 | 70 | 70 |
| Carbon black | 20 | — | — | — | — |
| Silane coupling agent | 3.0 | 4.5 | 4.5 | 4.5 | 4.5 |
| 300% stress (Kgf/cm$^2$) | 160 | 153 | 144 | 146 | 121 |
| tan δ 60° C. index (*3) | 112 | 114 | 112 | 109 | 100 |
| Abrasion resistance index (*3) | 146 | 137 | 133 | 139 | 100 |

(*1) Polybutadiene (manufactured by Nippon Zeon Co., Ltd.).
(*2) RSS No. 3.
(*3) These indices are expressed by taking the values of Comparative Formulation Example 6 as 100.

It can be seen from the results shown in Table 10 that, not only when a quaternary ammonium-containing diene rubber in accordance with the present invention is used alone as the rubber component (Formulation Example 20), but also when such a diene rubber is used in combination with another diene rubber (Formulation Examples 21–23), tensile strength, heat build-up and abrasion resistance are highly balanced.

Various embodiments of the present invention are given below.

(1) A diene rubber composed of 40 to 99.99% by weight of combined units of a conjugated diene monomer, 0 to 50% by weight of combined units of an aromatic vinyl monomer, and 0.01 to 20% by weight of combined units of a vinyl monomer containing an at least partially quaternized tertiary amino group, and having a Mooney viscosity (ML$_{1+4}$, 100° C.) of 10 to 200, wherein the tertiary amino-containing vinyl monomer is a compound of the formula $$CH_2=CR^{11}-A_2-NR^{12}R^{13}$$

where $R^{11}$ is a hydrogen atom or a lower alkyl group, $R^{12}$ and $R^{13}$ are each an alkyl group, an aryl group or an aralkyl group, $A_2$ is an alkylene group, an arylene group, an arylene-alkylene group, an alkylene-arylene group, or a linking group of the general formula —C(=O)—M—R$^{14}$— (in which M is an oxy group or an NH group, and $R^{14}$ is an alkylene group, an arylene group, an arylene-alkylene group or an alkylene-arylene group), and $R^{12}$ or $R^{13}$ may be combined with $A_2$ to form a heterocyclic ring, the quaternized tertiary amino-containing vinyl monomer is a compound of the formula $$CH_2=CR^1-A_1-N^+R^2R^3R^4.X_1^-$$

where $R^1$ is a hydrogen atom or a lower alkyl group, $R^2$, $R^3$ and $R^4$ are each an alkyl group, an aryl group or an aralkyl group, $A_1$ is an alkylene group, an arylene group, an arylene-alkylene group, an alkylene-arylene group, or a linking group of the general formula —C(=O)—M—R$^5$— (in which M is an oxy group or an NH group, and $R^5$ is an alkylene group, an arylene group, an arylene-alkylene group or an alkylene-arylene group), $R^2$ or $R^3$ may be combined with $A_1$ to form a heterocyclic ring, and $X_1$ is a halogen atom.

(2) A diene rubber as described in (1) wherein the quaternizing hydrocarbon group is an alkyl group, an aryl group or an aralkyl group.

(3) A diene rubber as described in (1) or (2) wherein the degree of quaternization is such that not less than 5 mole % of all tertiary amino groups present in the diene rubber are quaternized.

(4) A diene rubber as described in any of (1) to (3) wherein the content of quaternized quaternary ammonium-containing vinyl monomer units in the diene rubber is in the range of 0.01 to 20% by weight.

(5) A diene rubber as described in any of (1) to (4) wherein the quaternary ammonium-containing vinyl monomer is a compound of the general formula (2)

$$CH_2=CR^6-Ph(R^7)-(CH_2)_m-N^+R^8R^9R^{10}.X_2^- \qquad (2)$$

where $R^6$ and $R^7$ are each a hydrogen atom or a lower alkyl group, $R^8$, $R^9$ and $R^{10}$ are each an alkyl group, an aryl group or an aralkyl group. $X_2$ is a halogen atom, and m is an integer of 1 to 6.

(6) A diene rubber as described in (5) wherein the tertiary amino-containing vinyl monomer is a compound of the general formula (4)

$$CH_2=CR^{15}-Ph(R^{16})-(CH_2)_n-NR^{17}R^{18} \qquad (4)$$

where $R^{15}$ and $R^{16}$ are each a hydrogen atom or a lower alkyl group, $R^{17}$ and $R^{18}$ are each an alkyl group, an aryl group or an aralkyl group, and n is an integer of 1 to 6.

(7) A diene rubber as described in any of (1) to (6) wherein the tertiary amino-containing vinyl monomer is at least one member selected from the group consisting of an N,N-disubstituted aminoalkyl (meth)acrylate, an N,N-disubstituted aminoalkyl(meth)acrylamide, an N,N-disubstituted amino aromatic vinyl compound, an N,N-disubstituted aminoalkyl aromatic vinyl compound, and a pyridyl-containing vinyl compound.

(8) A diene rubber as described in (1) which is composed of 40 to 99.99% by weight of combined units of a conjugated diene monomer, 0 to 50% by weight of combined units of an aromatic vinyl monomer, and 0.01 to 20% by weight of combined units of a quaternary ammonium-containing vinyl monomer of the general formula (1)

$$CH_2=CR^1-A_1-N^+R^2R^3R^4.X_1^-  \qquad (1)$$

where $R^1$ is a hydrogen atom or a lower alkyl group, $R^2$, $R^3$ and $R^4$ are each an alkyl group, an aryl group or an aralkyl group, $A_1$ is an alkylene group, an arylene group, an arylene-alkylene group, an alkylene-arylene group, or a linking group of the general formula —C(=O)—M—$R^5$— (in which M is an oxy group or an NH group, and $R^5$ is an alkylene group, an arylene group, an arylene-alkylene group or an alkylene-arylene group), $R^2$ or $R^3$ may be combined with $A_1$ to form a heterocyclic ring, and $X_1$ is a halogen atom, and which has a Mooney viscosity ($ML_{1+4}$, 100° C.) of 10 to 200

(9) A diene rubber as described in (1) which is composed of 40 to 99.99% by weight of combined units of a conjugated diene monomer, 0 to 50% by weight of combined units of an aromatic vinyl monomer, and 0.01 to 20% by weight of combined units of a quaternary ammonium-containing vinyl monomer of the general formula (2)

$$CH=CR^6-Ph(R^7)-(CH_2)_m-N^+R^8R^9R^{10}.X_2^-  \qquad (2)$$

where $R^6$ and $R^7$ are each a hydrogen atom or a lower alkyl group, $R^8$, $R^9$ and $R^{10}$ are each an alkyl group, an aryl group or an aralkyl group, $X_2$ is a halogen atom, and m is an integer of 1 to 6, and which has a Mooney viscosity ($ML_{1+4}$, 100° C.) of 10 to 200.

(10) A diene rubber as described in any of (1) to (9) wherein the vinyl linkage content in the combined conjugated diene units is in the range of 5 to 95%.

(11) A process for preparing a diene rubber as described in any of (1) to (10) which comprises copolymerizing a conjugated diene, or a conjugated diene and an aromatic vinyl, with a tertiary amino-containing vinyl monomer and subsequently reacting the resulting polymer with a monohalogenated hydrocarbon.

(12) A process as described in (11) wherein the monohalogenated hydrocarbon is used in an amount of not less than 0.05 equivalent based on the total amount of tertiary amino groups present in the diene polymer rubber.

(13) A process as described in (11) or (12) wherein the monohalogenated hydrocarbon is a compound of the general formula (7)

$$R^{23}-X_5  \qquad (7)$$

where $R^{23}$ is an alkyl group, an aryl group or an aralkyl group and $X_5$ is a halogen atom.

(14) A process for preparing a diene rubber as described in any of (1) to (6) which comprises copolymerizing a conjugated diene, or a conjugated diene and an aromatic vinyl, with a halogen-containing vinyl monomer and subsequently reacting the resulting polymer with a tertiary amine.

(15) A process as described in (14) wherein the halogen-containing vinyl monomer is a compound of the general formula (5)

$$CH_2=CR^{19}-A_3-X_3  \qquad (5)$$

where $R^{19}$ is a hydrogen atom or a lower alkyl group, $A_3$ is an alkylene group, an arylene group, an arylene-alkylene group, an alkylene-arylene group, or a linking group of the general formula —C(=O)—M—$R^{20}$— (in which M is an oxy group or an NH group, and $R^{20}$ is an alkylene group, an arylene group, an arylene-alkylene group or an alkylene-arylene group), and $X_3$ is a halogen atom.

(16) A process as described in (14) wherein the halogen-containing vinyl monomer is a compound of the general formula (6)

$$CH_2=CR^{21}-Ph(R^{22})-(CH_2)_r-X_4  \qquad (6)$$

where $R^{21}$ and $R^{22}$ are each a hydrogen atom or a lower alkyl group, $X_4$ is a halogen atom, and r is an integer of 1 to 6.

(17) A process as described in any of (14) to (16) wherein the tertiary amine is used in an amount of not less than 1 equivalent based on the amount of halogen atoms contained in the diene polymer rubber.

(18) A process as described in any of (14) to (17) wherein the tertiary amine is a compound of the general formula (8)

$$NR^{24}R^{25}R^{26}  \qquad (8)$$

where $R^{24}$, $R^{25}$ and $R^{26}$ are each a lower alkyl group, an aryl group or an aralkyl group.

(19) A rubber composition comprising a rubber component and a reinforcing agent, the rubber component containing a diene rubber as described in any of (1) to (10).

(20) A rubber composition as described in (19) wherein the content of the diene rubber in the rubber component is not less than 10% by weight.

(21) A rubber composition as described in (19) or (20) wherein the reinforcing agent is used in an amount of 10 to 20 parts by weight per 100 parts by weight of the rubber component.

(22) A rubber composition as described in any of (19) to (21) wherein the reinforcing agent is carbon black or silica.

(23) A rubber composition as described in any of (19) to (21) wherein the reinforcing agent contains silica.

(24) A rubber composition as described in (22) or (23) wherein the nitrogen adsorption specific surface area (measured by the BET method) of silica is in the range of 50 to 400 m²/g.

(25) A rubber composition as described in (23) or (24) which further contains a silane coupling agent.

(26) A rubber composition as described in (25) wherein the silane coupling agent is used in an amount of 0.1 to 30 parts by weight per 100 parts by weight of silica.

(27) A rubber composition as described in any of (19) to (26) which further contains a vulcanizing agent, a vulcanization accelerator and a vulcanization activator.

(28) A rubber composition as described in (27) which contains 0.1 to 15 parts by weight of the vulcanizing agent and 0.1 to 15 parts by weight of the vulcanization accelerator per 100 parts by weight of the rubber component.

(29) A rubber composition as described in (27) or (28) wherein the vulcanization accelerator contains at least a sulfenamide type vulcanization accelerator.

(30) A rubber composition as described in any of (27) to (29) which contains zinc oxide as the vulcanization activator.

(31) A rubber composition as described in (30) wherein zinc oxide is used in an amount of 0.05 to 15 parts by weight per 100 parts by weight of the rubber component.

(32) A rubber composition as described in (30) or (31) wherein the particle size of zinc oxide is not greater than 5 µm.

(33) A diene rubber, a process for preparing the same, or a rubber composition containing the same as described in any of (1) to (32) wherein the conjugated diene is butadiene or isoprene.

(34) A diene rubber, a process for preparing the same, or a rubber composition containing the same as described in any of (1) to (33) wherein the aromatic vinyl is styrene.

The present invention provides a quaternary ammonium-containing diene rubber which, when silica is incorporated therein as a reinforcing agent, can yield a vulcanized rubber having improved heat build-up, tensile strength and abrasion resistance, as well as processes for preparing the same. Moreover, the present invention also provides rubber compositions which can yield vulcanized rubbers showing marked improvements in heat build-up, tensile strength and abrasion resistance.

The quaternary ammonium-containing diene rubber of the present invention and the rubber compositions containing the same are useful in various applications which make the most of their properties. For example, they can be used as materials for forming various parts of tires, such as tread, carcass, sidewalls and beads; for rubber products such as hoses, window frames, belts, shoe soles, rubber vibration isolators and automobile parts; and as reinforcing rubbers for resins such as impact-resistant polystyrene and ABS resin. In particular, they are highly useful for tire treads and can suitably be used to form, for example, the tire treads of low-fuel-consumption tires, all-season tires, high-performance tires and studless tires.

What is claimed is:

1. A diene rubber comprising 40 to 99.99% by weight of combined units of a conjugated diene monomer, 0 to 50% by weight of combined units of an aromatic vinyl monomer, and 0.01 to 20% by weight of combined units of other vinyl monomer comprising at least one of tertiary amino-containing vinyl monomer and halogen-containing vinyl monomer and wherein at least part of said combined other vinyl monomer is quaternized to form quaternized tertiary amino-containing vinyl monomer units, with the provisos that when said other vinyl monomer comprises combined tertiary amino-containing vinyl monomer units it is quaternized with a monohalogenated hydrocarbon and when said other vinyl monomer comprises combined halogen-containing vinyl monomer units it is quaternized with a tertiary amine, and having a Mooney viscosity $ML_{1+4}$, 100° C.) of 10 to 200, wherein the tertiary amino-containing vinyl monomer is a compound of the formula $$CH_2=CR^{11}-A_2-NR^{12}R^{13}$$

where $R^{11}$ is a hydrogen atom or a lower alkyl group, $R^{12}$ and $R^{13}$ are each, independently, an alkyl group, an aryl group or an aralkyl group, $A_2$ is an alkylene group, an arylene group, an arylene-alkylene group, an alkylene-arylene group, or a linking group of the general formula —C(=O)—M—$R^{14}$—, in which M is an oxy group or an NH group, and $R^{14}$ is an alkylene group, an arylene group, an arylene-alkylene group or an alkylene-arylene group, and $R^{12}$ or $R^{13}$ may be combined with $A_2$ to form a heterocyclic ring, and wherein the combined units of the quaternized tertiary amino-containing vinyl monomer have the formula

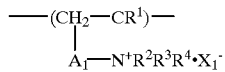

where $R^1$ is a hydrogen atom or a lower alkyl group, $R^2$, $R^3$ and $R^4$, are each, independently, an alkyl group, an aryl group or an aralkyl group, $A_1$ is an alkylene group, an arylene group, an arylene-alkylene group, an alkylene-arylene group, or a linking group of the general formula —C(=O)—M—$R^5$—, in which M is an oxy group or an NH group, and $R^5$ is an alkylene group, an arylene group, an arylene-alkylene group or an alkylene-arylene group, and $R^2$ or $R^3$ may be combined with $A_1$ to form a heterocyclic ring, and $X_1$ is a halogen atom.

2. A process for preparing a diene rubber as claimed in claim 1, which comprises copolymerizing a conjugated diene, or a conjugated diene and an aromatic vinyl monomer, with a tertiary amino-containing vinyl monomer and subsequently reacting the resulting polymer with a monohalogenated hydrocarbon.

3. A process as claimed in claim 2, wherein the monohalogenated hydrocarbon is a compound of the formula $$R^{23}-X_5$$

wherein $R^{23}$ is an alkyl group, an aryl group or an aralkyl group and $X_5$ is a halogen atom.

4. A process for preparing a diene rubber as claimed in claim 1, which comprises copolymerizing a conjugated diene, or a conjugated diene and an aromatic vinyl monomer, with a halogen-containing vinyl monomer and subsequently reacting the resulting polymer with a tertiary amine.

5. A process as claimed in claim 4, wherein the halogen-containing vinyl monomer is a compound of the formula $$CH_2=CR^{19}-A_3-X_3$$

where $R^{19}$ is a hydrogen atom or a lower alkyl group, $A_3$ is an alkylene group, an arylene group, an arylene-alkylene group, an alkylene-arylene group, or a linking group of the general formula —C(=O)—M—$R^{20}$— in which M is an oxy group or an NH group, and $R^{20}$ is an alkylene group, an arylene group, an arylene-alkylene group or an alkylene-arylene group, and $X_3$ is a halogen atom.

6. A process as claimed in claim 4, wherein the tertiary amine is a compound of the formula $$NR^{24}R^{25}R^{26}$$

where $R^{24}$, $R^{25}$ and $R^{26}$ are each independently a lower alkyl group, an aryl group or an aralkyl group.

7. A process as claimed in claim 2, wherein the copolymerization is carried out by emulsion polymerization.

8. A process as claimed in claim 3, wherein the copolymerization is carried out by emulsion polymerization.

9. A process as claimed in claim 4, wherein the copolymerization is carried out by emulsion polymerization.

10. A process as claimed in claim 5, wherein the copolymerization is carried out by emulsion polymerization.

11. A process as claimed in claim 6, wherein the copolymerization is carried out by emulsion polymerization.

12. A process as claimed in claim 5, where the tertiary amine is a compound of the formula $NR^{24}R^{25}R^{26}$ where $R^{24}$, $R^{25}$, and $R^{26}$ are each, independently, a lower alkyl group, an aryl group or an aralkyl group.

13. The diene rubber according to claim 1, wherein at least 5 mole % of the combined units of other vinyl monomer contain a quaternary ammonium group.

14. The diene rubber according to claim 1, wherein each of $R^{12}$, $R^{13}$, $R^2$, $R^3$ and $R^4$, independently, represent an alkyl group.

15. A rubber composition comprising a rubber component and a reinforcing agent, wherein the rubber component comprises the diene rubber of claim 1.

16. A rubber composition as claimed in claim 15, wherein the proportion of the diene rubber in the rubber component is not less than 10% by weight.

17. A rubber composition as claimed in claim 15, wherein the reinforcing agent comprises carbon black.

18. A rubber composition as claimed in claim 16, wherein the reinforcing agent comprises carbon black.

19. A rubber composition as claimed in claim 15, wherein the reinforcing agent comprises silica.

20. A rubber composition as claimed in claim 16, wherein the reinforcing agent comprises silica.

21. A rubber composition as claimed in claim 17, wherein the reinforcing agent further comprises silica.

22. A rubber composition as claimed in claim 18, wherein the reinforcing agent further comprises silica.

23. A rubber composition as claimed in claim 16, which further comprises a silane coupling agent.

24. A rubber composition as claimed in claim 23, wherein the silane coupling agent is used in an amount of 0.1 to 30 parts by weight per 100 parts by weight of silica.

* * * * *